July 5, 1966　　　　F. G. BACK　　　　3,259,013
VARIFOCAL LENS SYSTEM FOR CAMERAS USING LEAF TYPE SHUTTERS
Filed Feb. 21, 1963　　　　2 Sheets-Sheet 1

INVENTOR.
FRANK G. BACK
BY Albert F. Kronman
ATTORNEY

VARIATOR

ERECTOR

COMPENSATOR

RELAY

INVENTOR.
FRANK G. BACK
BY Albert F. Kronman
ATTORNEY 3,259,013
VARIFOCAL LENS SYSTEM FOR CAMERAS USING
LEAF TYPE SHUTTERS
Frank G. Back, 55 Sea Cliff Ave., Glen Cove, N.Y.
Filed Feb. 21, 1963, Ser. No. 260,123
2 Claims. (Cl. 88—57)

This invention relates to varifocal lens structures and particularly to a varifocal lens for use with still cameras employing leaf type shutters.

Previously known varifocal lenses employing the principles of optical image shift compensation have involved structures which have been bulky, large and limited as to the focal length covered thereby. Where a varifocal lens system is to be designed for a camera employing a leaf type shutter disposed immediately behind the lens, further difficulties of lens design arise. Such shutters have a fixed given distance from the image plane and a standardized maximum opening. The more or less prescribed back focal length of the camera lens imposes additional constraints upon the design of the lens. Since oblique rays have to pass through the system in such a way that are not cut off by the shutter, resulting in vignetting, further problems are injected into the varifocal lens construction.

While it is possible to solve the vignetting problem in first order by applying Gaussian optics, the abberational correction of such a system without increasing the number of lens elements and consequently the overall size of the assembly, has presented a problem heretofore unsolved.

Accordingly, it is an object of the present invention to provide a varifocal lens for use with still cameras having a leaf type shutter immediately behind the lens which will be smaller and lighter than previously known varifocal lenses.

Another object of the present invention is to provide a varifocal lens for use with leaf type shutters which will have abberational correction comparable to that of standard fixed focus camera lenses.

A further object of the present invention is to provide a varifocal lens for cameras using leaf type shutters which will not cause vignetting of the image.

A feature of the present invention is its use of not only specifically shaped lens elements but also the air spaces therebetween.

A further feature of the present invention is its use of highly refractive glass throughout the system in order to provide abberational correction.

In the accompanying drawings forming a part hereof, are illustrated one form of embodiment of the invention, in which.

Figure 1:
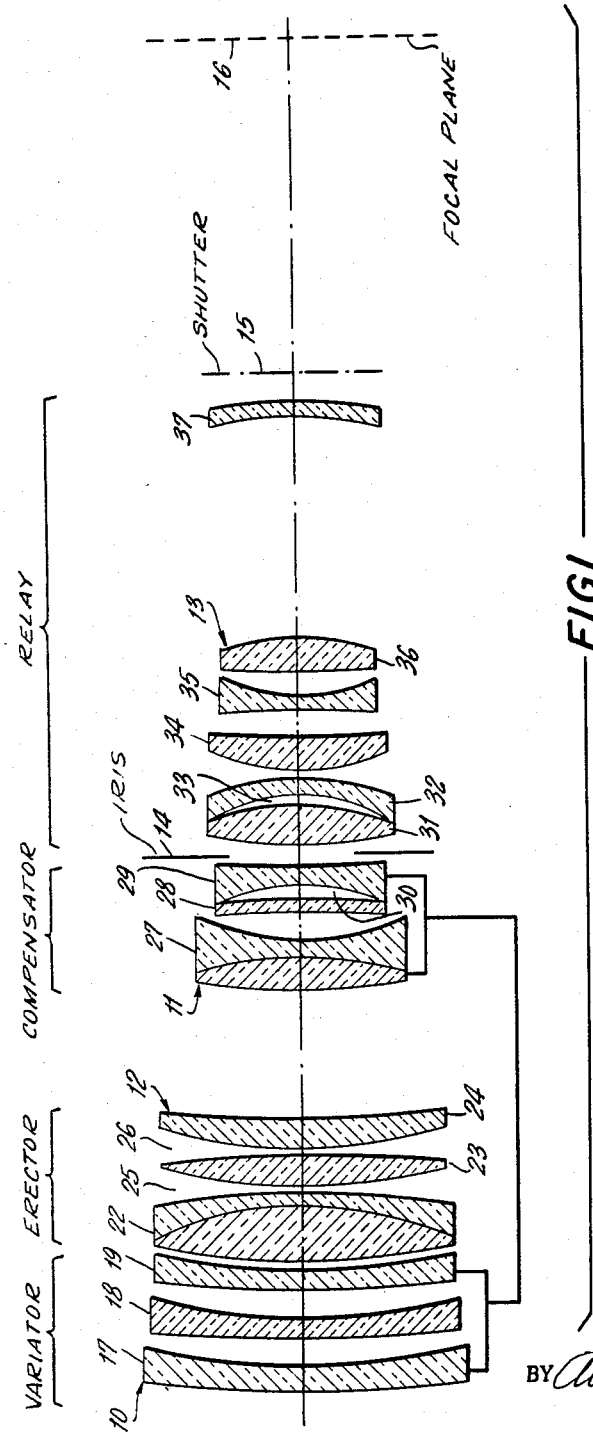
FIGURE 1 is a view in longitudinal section of a complete varifocal lens, made in accordance with the present invention.
Figure 2:
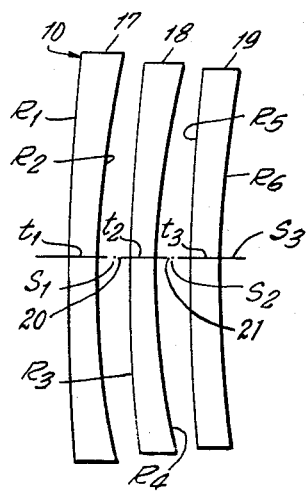
FIGURE 2 is a somewhat diagrammatic view in longitudinal section on an enlarged scale of the variator lens group shown in FIGURE 1.
Figure 3:
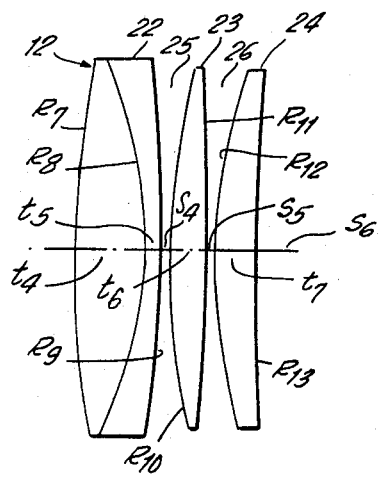
FIGURE 3 is a somewhat diagrammatic view in longitudinal section on an enlarged scale of the erector lens group shown in FIGURE 1.
Figure 4:
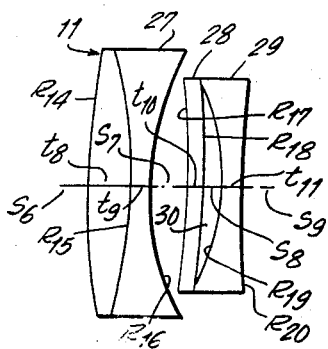
FIGURE 4 is a somewhat diagrammatic view in longitudinal section on an enlarged scale of the compensator lens group shown in FIGURE 1.
Figure 5:
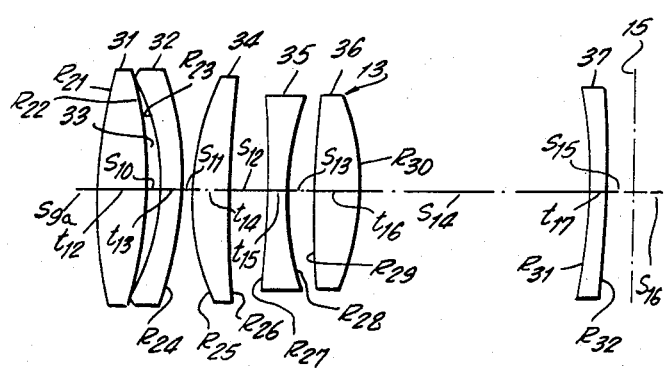
FIGURE 5 is a somewhat diagrammatic view in longitudinal section on an enlarged scale of the relay lens group shown in FIGURE 1.

Referring to the drawings, it will be seen that the varifocal lens system consists of a first movable lens groups 10 indicated by the bracket as the variator, a second movable lens group 11 indicated by the bracket as the compensator and a stationary lens group 12 between the variator and compensator indicated by the bracket as the erector. The variator 10 and compensator 11 are linked together for axial movement within the assembly, in accordance with well known optically compensated varifocal lens practices.

A relay 13 follows the variator 10, erector 12 and compensator 11 and is separated therefrom by the iris or stop 14. The leaf type shutter 15 is disposed between the last element of the relay 13 and the focal plane of the camera, indicated by the dashed lines 16.

The variator 10 consists of three negative menisci 17, 18, 19, which enclose two air spaces 20, 21. If the power of the whole system in its short focal position is designated by the symbol, $\Phi$, both the air lenses 20, 21 must have a power of more than one-quarter but less than one-half of the aforementioned absolute minimum power, or written as an inequality as follows:

$$|\tfrac{1}{4}\Phi| < \phi_{20} < |\tfrac{1}{2}\Phi|$$
$$|\tfrac{1}{4}\Phi| < \phi_{21} < |\tfrac{1}{2}\Phi|$$

where the symbol $\phi$ indicates the power of the element.

The erector 12 consists of a cemented doublet 22 followed by a bi-convex lens 23 and a positive meniscus 24. The rear surface $R_9$ of the doublet 22 and the front surface $R_{10}$ of the bi-convex lens 23, as well as the rear surface $R_{11}$ of the bi-convex lens 23 and the front surface $R_{12}$ of the meniscus 24 form two bi-concave air lenses 25, 26. The power of these lenses 25, 26 are more than one-half but less than equal to the aforementioned total power of the system in its minimum position, or:

$$\tfrac{1}{2}\Phi < \phi_{25} < \Phi$$
$$\tfrac{1}{2}\Phi < \phi_{26} < \Phi$$

The compensator 11 consists of a negative doublet 27, followed by a negative meniscus 28, concave to the direction of the incoming light. The negative meniscus 28 is followed by a bi-concave negative element 29. The rear surface $R_{18}$ of the meniscus 28 and the front surface $R_{19}$ of the bi-concave component 29 form an air lens 30 whose power is more than equal to but less than one and one-half times the absolute power of the whole system in its minimum position, or:

$$|\Phi| < \phi_{30} < |1\tfrac{1}{2}\Phi|$$

The compensator 11 is followed by the aperture stop 14 which in turn is followed by the relay 13 consisting of a telephoto system preceded by the collimating lens group. The collimating lens group consists of a bi-convex positive element 31 followed by a negative meniscus 32. These two lenses 31, 32 enclose an air lens 33 of negative power more than equal to but less than one and one-half times the absolute total power of the whole system in its short focal position, or:

$$|\Phi| < \phi_{33} < |1\tfrac{1}{2}\Phi|$$

The telephoto system behind the collimator consists of a triplet 34, 35, 36, of the Cook type followed by a single negative meniscus 37 as a rear element.

This telephoto system has a focal range of from 50 to 121.4 mm. and a back focal length of 39.51 mm. This triplet is shaped as follows: lens 34 a positive meniscus has a ratio of its front to its rear surface of more than 0.05 but less than 0.3. The meniscus 34 is followed by a bi-concave negative element 35 with an absolute ratio of its front surface $R_{27}$ to the rear surface $R_{28}$ of more than 3.00 but less than 15.00. The last lens 36 of the triplet has an absolute ratio of its front radius $R_{29}$ to its rear $R_{30}$ of more than 3.00 but less than 6.00. The negative rear element of the telephoto system has a ratio of its radii $R_{31}$ to $R_{32}$ of more than .30 but less than .60, or:

$$0.05 < \frac{R_{25}}{R_{26}} < 0.30$$

$$3.00 < \frac{R_{27}}{R_{28}} < 15.00$$

$$3.00 < \frac{R_{29}}{R_{30}} < 6.00$$

$$.30 < \frac{R_{31}}{R_{32}} < 0.60$$

The following table gives the optical characteristics of one form of varifocal lens system, as described above.

*Example I*

| Lens No. | Radius (R) mm. | Thickness (t) Air Spacing (s) | Glass Cat. Ref. | Index $N_D$ | Dispersion V |
|---|---|---|---|---|---|
| VARIATOR | | | | | |
| 17 | $R_1 = 883.57$ | $t_1 = 2.50$ | LaF-2 | 1.744 | 44.90 |
|  | $R_2 = 79.58$ | $s_1 = 3.50$ | | | |
|  | $R_3 = 250.10$ | | | | |
| 18 |  | $t_2 = 2.50$ | LaF-2 | 1.744 | 44.90 |
|  | $R_4 = 80.70$ | $s_2 = 3.50$ | | | |
|  | $R_5 = 270.88$ | | | | |
| 19 |  | $t_3 = 2.50$ | LaF-2 | 1.744 | 44.90 |
|  | $R_6 = 98.67$ | $s_3 = 1.93$ to 16.33 | | | |
| ERECTOR | | | | | |
| 22 | $R_7 = 93.11$ | $t_4 = 7.00$ | LaK-10 | 1.720 | 50.31 |
|  | $R_8 = -40.45$ | $t_5 = 1.50$ | SF-18 | 1.7215 | 29.28 |
|  | $R_9 = -160.61$ | $s_4 = .25$ | | | |
|  | $R_{10} = 63.85$ | | | | |
| 23 |  | $t_6 = 4.00$ | LaK-9 | 1.691 | 54.79 |
|  | $R_{11} = -240.37$ | $s_5 = .25$ | | | |
|  | $R_{12} = 56.17$ | | | | |
| 24 |  | $t_7 = 4.16$ | LaK-9 | 1.691 | 54.79 |
|  | $R_{13} = 310.44$ | $s_6 = 15.15$ to .75 | | | |
| COMPENSATOR | | | | | |
|  | $R_{14} = 84.77$ | $t_8 = 4.50$ | SF-18 | 1.7215 | 29.28 |
| 27 | $R_{15} = 43.06$ | $t_9 = 1.50$ | LaK-10 | 1.720 | 50.31 |
|  | $R_{16} = 26.21$ | $s_7 = 3.50$ | | | |
| 28 | $R_{17} = -97.46$ | $t_{10} = 1.60$ | LaSF-2 | 1.8374 | 43.47 |
|  | $R_{18} = -763.85$ | $s_8 = 1.90$ | | | |
|  | $R_{19} = -32.28$ | | | | |
| 29 | $R_{20} = 1323.99$ | $t_{11} = 1.74$ | LaSF-2 | 1.8374 | 43.47 |
|  |  | $s_9 = 1.00$ to 15.40 | | | |
| IRIS | | | | | |
|  |  | $s_{9a} = 1.00$ | | | |

| Lens No. | Radius (R) mm. | Thickness (t) Air Spacing (s) | Glass Cat. Ref. | Index $N_D$ | Dispersion V |
|---|---|---|---|---|---|
| RELAY | | | | | |
| 31 | $R_{21} = +40.86$ | $t_{12} = 5.00$ | BK-7 | 1.5168 | 64.19 |
|  | $R_{22} = -35.35$ | $s_{10} = 1.40$ | | | |
|  | $R_{23} = -20.77$ | | | | |
| 32 |  | $t_{13} = 2.00$ | LaF-7 | 1.7495 | 34.99 |
|  | $R_{24} = -30.16$ | $s_{11} = .50$ | | | |
|  | $R_{25} = +23.57$ | | | | |
| 34 |  | $t_{14} = 4.50$ | SK-16 | 1.6204 | 60.29 |
|  | $R_{26} = +182.45$ | $s_{12} = 3.00$ | | | |
|  | $R_{27} = -233.63$ | | | | |
| 35 |  | $t_{15} = 2.00$ | LaK-10 | 1.720 | 50.31 |
|  | $R_{28} = +20.35$ | $s_{13} = 3.00$ | | | |
|  | $R_{29} = +108.73$ | | | | |
| 36 |  | $t_{16} = 4.50$ | SK-16 | 1.6204 | 60.29 |
|  | $R_{30} = -25.16$ | $s_{14} = 22.30$ | | | |
|  | $R_{31} = -39.23$ | | | | |
| 37 |  | $t_{17} = 2.00$ | SF-18 | 1.7215 | 29.28 |
|  | $R_{32} = -96.03$ | $s_{15} = 2.75$ | | | |
| SHUTTER | | | | | |
|  |  | $s_{16} = 36.76$ | | | |
| IMAGE PLANE | | | | | |

LaF = Lanthanum Flint.
LaK = Lanthanum Crown.
SF = Dense Flint.
LaSF = Dense Lanthanum Flint.
BK = Borosilicate Crown.
SK = Dense Crown.

A second example of a varifocal lens system in accordance with the present invention is as follows:

*Example II*

| Lens No. | Radius (R) mm. | Thickness (t) Air Spacing (s) | Glass Cat. Ref. | Index $N_D$ | Dispersion V |
|---|---|---|---|---|---|
| 17 | $R_1 = 716.03$ | $t_1 = 2.50$ | LaF-2 | 1.744 | 44.90 |
|  | $R_2 = 78.03$ | $s_1 = 3.50$ | | | |
|  | $R_3 = 379.86$ | | | | |
| 18 |  | $t_2 = 2.50$ | LaF-2 | 1.744 | 44.90 |
|  | $R_4 = 89.03$ | $s_2 = 3.50$ | | | |
|  | $R_5 = 465.62$ | | | | |
| 19 |  | $t_3 = 2.50$ | LaF-2 | 1.744 | 44.90 |
|  | $R_6 = 118.41$ | $s_3 = 1.70$ Max. to 16.10 Min. | | | |
| ERECTOR | | | | | |
|  | $R_7 = 103.25$ | $t_4 = 7.00$ | LaK-10 | 1.720 | 50.31 |
| 22 | $R_8 = -38.53$ |  | | | |
|  | $R_9 = -140.37$ | $t_5 = 1.50$ | SF-18 | 1.7215 | 29.28 |
|  |  | $s_4 = .25$ | | | |
|  | $R_{10} = 63.55$ | | | | |
| 23 |  | $t_6 = 4.00$ | LaK-9 | 1.691 | 54.79 |
|  | $R_{11} = -259.21$ | $s_5 = .25$ | | | |
|  | $R_{12} = 54.09$ | | | | |
| 24 |  | $t_7 = 4.20$ | LaK-9 | 1.691 | 54.79 |
|  | $R_{13} = 272.04$ | $s_6 = 15.43$ Max. to 1.03 Min. | | | |
| COMPENSATOR | | | | | |
|  | $R_{14} = 86.41$ | $t_8 = 4.50$ | SF-18 | 1.7215 | 29.28 |
| 27 | $R_{15} = -35.64$ | $t_9 = 1.50$ | LaK-10 | 1.720 | 50.31 |
|  | $R_{16} = 26.29$ | $s_7 = 3.50$ | | | |
| 28 | $R_{17} = -96.50$ | $t_{10} = 1.60$ | LaSF-2 | 1.8374 | 43.47 |
|  | $R_{18} = -763.85$ | $s_8 = 1.62$ | | | |
|  | $R_{19} = -32.28$ | | | | |
| 29 | $R_{20} = 1354.21$ | $t_{11} = 1.60$ | LaSF-2 | 1.8374 | 43.48 |
|  |  | $s_9 = 1.00$ Max. to 15.40 Min. | | | |

| Lens No. | Radius (R) mm. | Thickness (t) Air Spacing (s) | Glass Cat. Ref. | Index $N_D$ | Dispersion V |
|---|---|---|---|---|---|
| IRIS | | | | | |
| | | $s_{9a}=1.00$ | | | |
| RELAY | | | | | |
| 31 | $R_{21}=40.11$ $R_{22}=-35.96$ | $t_{12}=5.00$ $s_{10}=1.40$ | BK-7 | 1.52168 | 64.19 |
| 32 | $R_{23}=-20.55$ $R_{24}=-30.40$ | $t_{13}=2.00$ $s_{11}=.50$ | SF-18 | 1.7215 | 29.28 |
| 34 | $R_{25}=24.30$ $R_{26}=225.28$ | $t_{14}=4.50$ $s_{12}=3.09$ | SK-16 | 1.6204 | 60.29 |
| 35 | $R_{27}=-166.62$ $R_{28}=21.44$ | $t_{15}=2.00$ $s_{13}=3.00$ | LaK-10 | 1.720 | 50.31 |
| 36 | $R_{29}=111.10$ $R_{30}=-25.24$ | $t_{16}=4.50$ $s_{14}=23.00$ | SK-16 | 1.6204 | 60.29 |
| 37 | $R_{31}=-34.42$ $R_{32}=-68.45$ | $t_{17}=2.00$ $s_{15}=2.40$ | SF-18 | 1.7215 | 29.28 |
| SHUTTER | | | | | |
| | | $s_{16}=36.77$ | | | |

EFL=50–121.00 mm.
BFL=39.17 mm. $R_1$ to $R_{32}$=the surface of the lens system in the order of the incident ray.

Having thus fully described the invention, what is claimed as new and desired to be secured by Letters Patent of the United States, is:

1. A varifocal lens assembly for use with cameras employing a leaf type shutter immediately behind the lens comprising in the order of the entrant light beam, a variator lens group of spaced negative lenses enclosing two air lenses, an erector lens group of spaced fixed positive lenses enclosing two bi-concave air lenses, a compensator lens group of spaced lenses of negative power the last two elements of which enclose an air lens, said variator lens group and compensator lens group being linked together in fixed spaced relationship and axially slidable with respect to the erector lens group, and a relay consisting of a telephoto system preceded by a collimating lens group consisting of a bi-convex positive element followed by a negative meniscus, said collimating lens group enclosing an air lens of negative power and in which the elements have the following optical characteristics wherein $N_D$ is the refractive index for the D line, V is Abbe's dispersion number, LaF stands for Lanthanum Flint, LaK stands for Lanthanum Crown, SF stands for Dense Flint, LaSF stands for Dense Lanthanum Flint, BK stands for Borosilicate Crown, SK stands for Dense Crown:

| Lens No. | Radius (R) mm. | Thickness (t) Air Spacing (s) | Glass Cat. Ref. | Index $N_D$ | Dispersion V |
|---|---|---|---|---|---|
| VARIATOR | | | | | |
| 17 | $R_1=883.57$ $R_2=79.58$ | $t_1=2.50$ $s_1=3.50$ | LaF-2 | 1.744 | 44.90 |
| 18 | $R_3=250.10$ $R_4=80.70$ | $t_2=2.50$ $s_2=3.50$ | LaF-2 | 1.744 | 44.90 |
| 19 | $R_5=270.88$ $R_6=98.67$ | $t_3=2.50$ $s_3=1.93$ to 16.33. | LaF-2 | 1.744 | 44.90 |
| ERECTOR | | | | | |
| 22 | $R_7=93.11$ $R_8=-40.45$ | $t_4=7.00$ $t_5=1.50$ | LaK-10 SF-18 | 1.720 1.7215 | 50.31 29.28 |
| 23 | $R_9=-160.61$ $R_{10}=63.85$ | $s_4=.25$ $t_6=4.00$ | LaK-9 | 1.691 | 54.79 |
| 24 | $R_{11}=-240.37$ $R_{12}=56.17$ $R_{13}=310.44$ | $s_5=.25$ $t_7=4.16$ $s_6=15.15$ to .75. | LaK-9 | 1.691 | 54.79 |
| COMPENSATOR | | | | | |
| 27 | $R_{14}=84.77$ $R_{15}=-43.06$ | $t_8=4.50$ $t_9=1.50$ | SF-18 LaK-10 | 1.7215 1.720 | 29.28 50.31 |
| 28 | $R_{16}=26.21$ $R_{17}=-97.46$ $R_{18}=-763.85$ | $s_7=3.50$ $t_{10}=1.60$ $s_8=1.90$ | LaSF-2 | 1.8374 | 43.47 |
| 29 | $R_{19}=-32.28$ $R_{20}=1323.99$ | $t_{11}=1.74$ $s_9=1.00$ to 15.40. | LaSF-2 | 1.8374 | 43.47 |
| IRIS | | | | | |
| | | $s_{9a}=1.00$ | | | |
| RELAY | | | | | |
| 31 | $R_{21}=+40.86$ $R_{22}=-35.35$ | $t_{12}=5.00$ $s_{10}=1.40$ | BK-7 | 1.5168 | 64.19 |
| 32 | $R_{23}=-20.77$ $R_{24}=-30.16$ | $t_{13}=2.00$ $s_{11}=.50$ | LaF-7 | 1.7495 | 34.99 |
| 34 | $R_{25}=+23.57$ $R_{26}=+182.45$ | $t_{14}=4.50$ $s_{12}=3.00$ | SK-16 | 1.6204 | 60.29 |
| 35 | $R_{27}=-233.63$ $R_{28}=+20.35$ | $t_{15}=2.00$ $s_{13}=3.00$ | LaK-10 | 1.720 | 50.31 |
| 36 | $R_{29}=+108.73$ $R_{30}=-25.16$ | $t_{16}=4.50$ $s_{14}=22.30$ | SK-16 | 1.6204 | 60.29 |
| 37 | $R_{31}=-39.23$ $R_{32}=-96.03$ | $t_{17}=2.00$ $s_{15}=2.75$ | SF-18 | 1.7215 | 29.28 |
| SHUTTER | | | | | |
| | | $s_{16}=36.76$ | | | |

LaF=Lanthanum Flint.
LaK=Lanthanum Crown.
SF=Dense Flint.
LaSF=Dense Lanthanum Flint.
BK=Borosilicate Crown.
SK=Dense Crown.

wherein the lens elements are numbered in order from front to rear in the first column, the radii of curvature R of the lens surfaces are given in the second column, the respective surfaces being numbered from front to rear and being respectively identified by the subscript numeral used with each R, with plus and minus values of R indicating curved surfaces which are respectively convex and concave toward the front of the lens, the axial thicknesses $t$ of the respective lens elements and the axial thicknesses $s$ of the air spaces between lens elements being given in the third column, the respective lens element thicknesses and air spaces being separately numbered from front to rear and being respectively identified by numerical subscripts used with each $t$ and $s$.

2. A varifocal lens assembly for use with cameras employing a leaf type shutter immediately behind the lens comprising in the order of the entrant light beam, a variator lens group of spaced negative lenses enclosing two air lenses, an erector lens group of spaced fixed positive lenses enclosing two bi-concave air lenses, a compensator lens group of spaced lenses of negative power the last two elements of which enclose an air lens, said variator lens group and compensator lens group being linked together in fixed spaced relationship and axially slidable with respect to the erector lens group, and a relay consisting of a telephoto system preceded by a collimating lens group consisting of a bi-convex positive element followed by a negative meniscus, said collimating lens group enclosing an air lens of negative power and in which the elements have the following optical characteristics wherein $N_D$ is the refractive index for the D line, V is Abbe's dispersion number, LaF stands for Lanthanum Flint, LaK stands for Lanthanum Crown, SF stands for Dense Flint, LaSF stands for Dense Lanthanum Flint, BK stands for Borosilicate Crown, SK stands for Dense Crown:

| Lens No. | Radius (R) mm. | Thickness ($t$) Air Spacing ($s$) | Glass Cat. Ref. | Index $N_D$ | Dispersion V |
|---|---|---|---|---|---|
| VARIATOR | | | | | |
| 17 | $R_1=716.03$ | $t_1=2.50$ | LaF-2 | 1.744 | 44.90 |
|  | $R_2=78.03$ | $s_1=3.50$ | | | |
| 19 | $R_3=379.86$ | $t_2=2.50$ | LaF-2 | 1.744 | 44.90 |
|  | $R_4=89.03$ | $s_2=3.50$ | | | |
| 19 | $R_5=465.62$ | $t_3=2.50$ | LaF-2 | 1.744 | 44.90 |
|  | $R_6=118.41$ | $s_3=1170$ Max. to 16.10 Min. | | | |
| ERECTOR | | | | | |
|  | $R_7=103.25$ | $t_4=7.00$ | LaK-10 | 1.720 | 50.31 |
| 22 | $R_8=-38.53$ | $t_5=1.50$ | SF-18 | 1.7215 | 29.28 |
|  | $R_9=-140.37$ | $s_4=.25$ | | | |
|  | $R_{10}=63.55$ | $t_6=4.00$ | LaK-9 | 1.691 | 54.79 |
| 23 | $R_{11}=-259.21$ | $s_5=.25$ | | | |
|  | $R_{12}=54.09$ | $t_7=4.20$ | LaK-9 | 1.691 | 54.79 |
| 24 | $R_{13}=272.04$ | $s_6=15.43$ Max. 1.03 Min. | | | |
| COMPENSATOR | | | | | |
| 27 | $R_{14}=86.41$ | $t_8=4.50$ | SF-18 | 1.7215 | 29.28 |
|  | $R_{15}=-35.64$ | $t_9=1.50$ | LaK-10 | 1.720 | 50.31 |
|  | $R_{16}=26.29$ | $s_7=3.50$ | | | |
|  | $R_{17}=-96.50$ | $t_{10}=1.60$ | LaSF-2 | 1.8374 | 43.47 |
| 28 | $R_{18}=-763.85$ | $s_8=1.62$ | | | |
| 29 | $R_{19}=-32.28$ | $t_{11}=1.60$ | LaSF-2 | 1.8374 | 43.48 |
|  | $R_{20}=1354.21$ | $s_9=1.00$ Max. to 15.40 | | | |
| IRIS | | | | | |
|  | | $s_{9a}=1.00$ | | | |
| RELAY | | | | | |
| 31 | $R_{21}=40.11$ | $t_{12}=5.00$ | BK-7 | 1.52168 | 64.19 |
|  | $R_{22}=-35.96$ | $s_{10}=1.40$ | | | |
|  | $R_{23}=-20.55$ | $t_{13}=2.00$ | SF-18 | 1.7215 | 29.28 |
| 32 | $R_{24}=-30.40$ | $s_{11}=.50$ | | | |
|  | $R_{25}=24.30$ | $t_{14}=4.50$ | SK-16 | 1.6204 | 60.29 |
| 34 | $R_{26}=225.28$ | $s_{12}=3.09$ | | | |
|  | $R_{27}=-166.62$ | $t_{15}=2.00$ | LaK-10 | 1.720 | 50.31 |
| 35 | $R_{28}=21.44$ | $s_{13}=3.00$ | | | |
|  | $R_{29}=111.10$ | $t_{16}=5.40$ | SK-16 | 1.6204 | 60.29 |
| 36 | $R_{30}=-25.24$ | $s_{14}=23.00$ | | | |
|  | $R_{31}=-34.42$ | $t_{17}=2.00$ | SF-18 | 1.7215 | 29.28 |
| 37 | $R_{32}=-68.45$ | $s_{15}=2.40$ | | | |
| SHUTTER | | | | | |
|  | | $s_{16}=36.77$ | | | |

EFL=50–121.00 mm.
BFL=39.17 mm.

wherein the lens elements are numbered in order from front to rear in the first column, the radii of curvature R of the lens surfaces are given in the second column, the respective surfaces being numbered from front to rear and being respectively identified by the subscript numeral used with each R, with plus and minus values of R indicating curved surfaces which are respectively convex and concave toward the front of the lens, the axial thicknesses $t$ of the respective lens elements and the axial thicknesses $s$ of the air spaces between lens elements being given in the third column, the respective lens element thicknesses and air spaces being separately numbered from front to rear and being respectively identified by numerical subscripts used with each $t$ and $s$.

No references cited.

JEWELL H. PEDERSEN, *Primary Examiner.*
R. J. STERN, *Assistant Examiner.*